Aug. 21, 1951  W. DRABOLD  2,565,068
INTERNAL-COMBUSTION ENGINE
Filed July 29, 1948
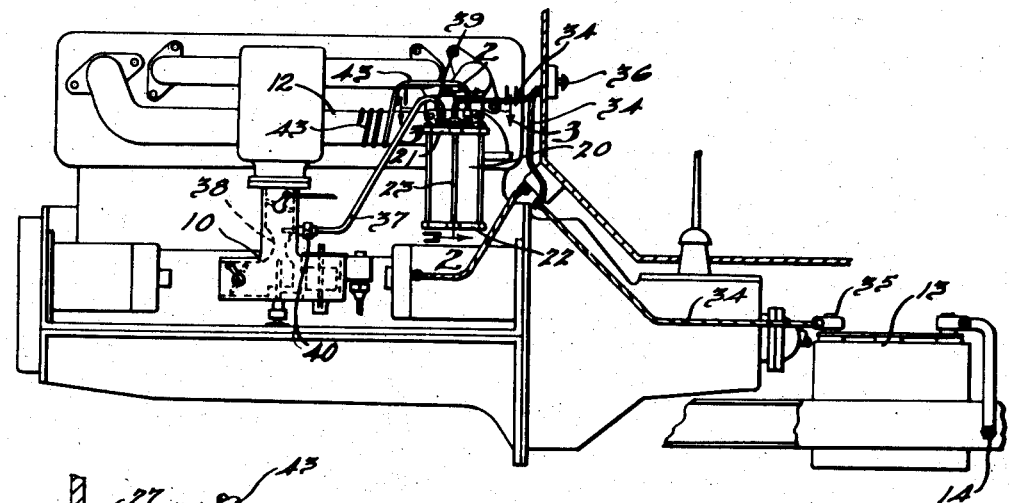
INVENTOR.
Walter Drabold.
BY
Gregory S. Dolgorukov
ATTORNEY.

Patented Aug. 21, 1951

2,565,068

UNITED STATES PATENT OFFICE 2,565,068

INTERNAL-COMBUSTION ENGINE

Walter Drabold, Detroit, Mich.

Application July 29, 1948, Serial No. 41,275

11 Claims. (Cl. 123—119)

This invention relates to internal combustion engines and more particularly to means for improving combustion of charges supplied to engine cylinders.

It has been appreciated in the art that introduction of a small amount of water vapour into the combustion chamber of a gasoline engine together with the regular combustible charge supplied by the carburetor and consisting of mixture of air and gasoline vapour in a predetermined proportion, tends to improve combustion of the charge and operation of the engine. Various explanations of the above phenomenon have been offered by those skilled in the art. One of the most commonly accepted explanations is to the effect that upon ignition of the charge due to exceedingly high temperature attained at the moment of highest pressure in the cylinder the water decomposes into its constituent gases, hydrogen and oxygen, which gases are immediately ignited and combine again to form water vapour with liberation of heat. While it is also appreciated that thermo-dynamically no heat is actually gained in such a process, since the heat realized by the combustion of the oxygen and hydrogen so produced is equal to the heat consumed in decomposing the water, it is thought that the observed improvement in engine performance results from smoothening of the pressure curve during the working stroke of the piston, producing more uniform pressure thereon throughout the working stroke and decreasing the tendency of the charge to detonate. It will be understood, however, that I do not wish to be bound by the above scientific theory which, while prevalent in the art, may or may not be correct.

I have discovered that much superior and more uniform results can be attained if the water is already decomposed and it is already the combustible mixture of hydrogen and oxygen that enters the engine cylinder. An apparatus based on the above discovery is disclosed in my U. S. Patent No. 1,876,879. In that device I utilize electric current from the engine storage battery to decompose water by electrolysis and conduct the mixture of hydrogen and oxygen so produced to the engine carburetor, introducing such mixture into the carburetor with the aid of a special conduit at the discharge end of the Venturi passage thereof. I also utilize the oxygen and hydrogen liberated from the storage battery of the engine by collecting said gases and discharging them into the carburetor by the same conduit.

While the above device has materially improved operation of the engines where it was installed, in some instances without any apparent reasons therefor such improvement was no† as consistant and marked as in others. I have further discovered that the above difficulty is due to the fact that because of the violence of the process of electrolysis a considerable proportion of water is carried into the cylinders either in the form of vapour or in the form of minute water particles which are constantly shot off from the surface of the water, which surface is constantly disrupted by the rising gas bubbles. A similar phenomenon may be observed, for example, by holding a glass of carbonated water against the light. The particles of water, due to their greater weight and the operation of the centrifugal force at the turns of the intake manifold, may not be distributed evenly among the cylinders, and some cylinders may get excessive amount of water mist while others get very little of it, if any. Evaporation of water into steam and its decomposition into oxygen and hydrogen take considerable amount of heat; also the time consumed thereby is appreciable when compared with the duration of a piston stroke, which may last as little as one hundredth of a second. Therefore, combustion of the cylinder charge during working strokes in some cylinders may be disorganized rather than aided by the introduction of water mist therein. This, in turn, may affect the dynamic balance of the engine, producing rough operation of the engine, thus completely destroying the benefit which could be derived by a proper addition of hydrogen and oxygen mixture to the charges of the engine cylinders.

One of the objects of the present invention is to provide an improved method of decomposing water and supplying the resulting gases to engine cylinders, by virtue of which method the above disadvantages are overcome and largely eliminated, and the advantages expected from addition to the cylinder charges of a mixture of hydrogen and oxygen are fully realized.

Another object of the present invention is to provide an improved method of the above character whereby passage of water to the engine cylinders is prevented and evaporation of the water in the process of electrolysis is reduced to a minimum.

A further object of the invention is to provide an improved apparatus for decomposing water and supplying the resulting gases to the engine cylinders.

A further object of the invention is to provide an improved apparatus of the above character having means to maintain the discharge of gases by the generator substantially uniform irrespective of the changes in the water level in the water container of the generator.

A still further object of the present invention is to provide an improved method and means preventing the flow of water into the engine by the capillary action in the gas tubes or conduits.

A still further object of the invention is to provide an improved hydrogen-oxygen generator for internal combustion engines, which generator is constructed as a self-sustained unit and may be easily installed in any gasoline engine without making changes in such engine, and can be just as easily removed therefrom, if desired.

A still further object of the invention is to provide apparatus of the foregoing character which is compact, simple in construction, dependable in operation, is easy to service and inexpensive to manufacture.

Other objects of this invention will appear in the following description and appended claims, reference being had to the accompanying drawing forming a part of this specification, wherein like reference characters designate corresponding parts in the several views.

Fig. 1 is a view of an internal combustion engine embodying the present invention.

Fig. 2 is a sectional view taken in the direction of the arrows on the section plane passing through the section line 2—2 of Fig. 1 and illustrating my hydrogen-oxygen generator separately.

Fig. 3 is a top view of the device of Fig. 2.

Fig. 4 is a fragmentary sectional view taken in the direction of the arrows on the section plane passing through the line 4—4 of Fig. 3.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation. Particularly it should be noted that while the hydrogen and oxygen are produced by decomposition of water molecules and the liquid or electrolyte used in my device is referred to herein as "water," this term is employed to mean any suitable electrolyte, such for instance as water with a quantity of potassium hydroxide dissolved in it. Such a composition of the electrolyte effects desired electric conductivity and prevents hard freezing of the liquid in winter time.

In the drawing there is shown, by way of example, an internal combustion engine embodying the present invention. The engine shown is of the gasoline type and it includes a carburetor 10 the combustible mixture forming portion whereof is operatively connected with the aid of a suitable conduit to the engine manifold, and an exhaust conduit or manifold 12. A storage battery 13 is mounted in close proximity to the engine and is electrically connected thereto in a manner well known in the art for supplying electric current to various devices of the engine and the vehicle. One terminal of the battery is grounded on the vehicle and engine structure as shown at 14. The construction so far described is well known in the art and no description of other conventional parts thereof is believed to be necessary for a proper understanding of the present invention.

In accordance with my improved method I form a mixture of hydrogen and oxygen by decomposing water by electrolysis in a suitable container. In order to prevent the gases produced by electrolysis from carrying water into the engine cylinder as well as to prevent excessive surface evaporation of the water, I keep the water covered with a layer of liquid which does not dissolve in water, does not readily evaporate, floats on water and is capable of preventing passage of water particles. I have found that a layer of low melting wax-like material, such for instance as paraffin which is inexpensive and stable, gives very satisfactory results. Thus the gases produced by electrolysis must first pass through a layer of molten wax before they can enter the intake conduit of the engine. By covering the surface of the water, the wax prevents not only water particles from breaking away from the surface constantly broken by the rising bubbles of gases but it also decreases evaporation of the water from the surface. Moreover, the water particles entrapped by the wax are returned to the general mass of water in the container, which eliminates the necessity of replenishing the water in the container too often. These advantages could not be realized, if a separate water trap was used. In addition, it should be realized that by covering the walls of the receptacle and of the gas conveying tubes or conduits, a thin film of wax prevents their "wetting" by water and interrupts flow of water to the cylinders caused by its adherence to said walls and movement toward the cylinders by the frictional action of the moving gases.

For carrying out the above method I prefer to use the apparatus illustrated in the drawing. Said apparatus is, in effect, a hydrogen-and-oxygen generator and it comprises a glass receptacle 20 having a top cover designated by the numeral 21, and a bottom support 22 connected to the cover 21 by means of long studs 23 carried by said bottom support. The studs 23 pass through holes in the cover 21 and have nuts 24 provided on their upper ends. A cover gasket 25 is provided between the edges of the receptacle 20 and the cover 21. By screwing the cover on the receptacle (or vice versa) the gasket 25 is compressed and seals the cover on the receptacle. By tightening the nuts 24, the bottom support 22 is drawn tightly against the bottom of the receptacle, a rubber ring 26 being provided to effect tight and resilient support of the receptacle. If desired, the complimentary screw threads on the top portion of the receptacle 20 and on the cover may be omitted, in which case tightening of the cover 21 on the receptacle is effected solely with the aid of the nuts 24. The cover 21 has a bracket 27 by which the device is attached to the engine or vehicle structure at any suitable place thereof with the aid of screws 28.

The cover 21 carries two electrodes 30 and 31 extending virtually to the bottom of the receptacle 20 and electrically connected to the terminal of the battery 13. The electrode 30 is secured directly to the cover 21 by a screw thread connection as indicated at 32 and is thus grounded on the cover and the engine structure being thus, in effect, connected to the grounded terminal of the battery 13. The electrode 31 is electrically insulated from the cover 21 with the aid of an insulating plug 29 and is provided with a terminal 33 to which an electric wire 34 leading from the terminal 35 of the battery 13 is detachably connected. A switch 36 is interposed in said conduit 34 and is mounted on the dash board of the vehicle for convenient operation. By virtue of the above construction electric current is supplied to the electrodes 30 and 31 to effect decomposition of water into hydrogen and oxygen. Operation of the device is started and terminated at will of the operator by the use of the switch 36. The switch 36 may be the conventional switch controlling ignition of the engine, thereby ensuring that my hydrogen-oxygen generator operates only when the engine is running, and is switched on and off automatically in the process of controlling the engine and without any special attention on the part of the operator. As an alternative, the wire 34 may be connected to the electric generator line ahead of relay cut-out. With such a connection the device will operate only when the engine is running. A tube 37 is provided to lead the gases resulting from electrolysis to the intake conduit of the engine, introducing said gases thereinto. The tube 37 is provided with threaded connections 39 and 44 for convenient attachment to the cover 21 and the carburetor, respectively. As an alternative, the tube 37 may be connected to the windshield wiper vacuum line with the aid of a T-connection inserted between the metal tube and the rubber hose of said line.

The electrodes 30 and 31 are made converging toward the bottom of the receptacle. As the water level in the receptacle 20 goes down, the surface area of the electrodes through which the electric current flows decreases, thus increasing the resistance of water mass to the flow of the electric current and decreasing its strength proportionally. This, in turn, decreases the gas-generating capacity of the device. Convergence of the electrodes operates to counteract the above undesirable tendency. The angle of convergence of the electrodes is determined experimentally to effect a substantially uniform performance of the device. An angle of approximately 15 degrees gives very satisfactory results for average conditions.

A filling opening normally closed with the aid of a plug 41 is provided on the cover 21 in order to enable the operator to replenish the water in the receptacle from time to time. Transparency of the glass receptacle 20 eliminates the need for any indicators of the water level in the receptacle.

In accordance with the invention a layer 42 of wax-like material, such as paraffin, is maintained on top of the water mass in the receptacle. In order to ensure that the wax melts within a few minutes after the engine is started, a heat conducting member 43 in the form of a copper tube is provided. The member 43 has one end connected to the cover 21 by means of a threaded pipe connection 44, while its opposite end is adapted to be connected to a hot portion of the engine structure, such as the exhaust gases conduit or manifold. Such a connection may be effected in any suitable manner such as by winding the tube 43 around the exhaust conduit as shown at 45. The end of the tube 43 may be left open. When the engine is operating, the air is sucked through this end and upon mixing with the generated gases flows into the engine. This open end also provides an escape for the gases should the ignition switch be left on without starting the engine. By virtue of such a construction the cover 21 together with the electrodes and the receptacle 20 are heated by conduction and the wax is quickly melted and is maintained in molten condition as long as the engine is running or remains hot.

In operation, as the gases are liberated by the action of the electric current and rise in the form of bubbles from the electrodes 30 and 31, they pass through the wax layer and are collected at the top of the receptacle. In order to collect the gases at the top of the receptacle, a gas-receiving chamber is provided thereat, which chamber is formed between the cover 21 and a splash or shield plate 46. The plate 46 is carried by the cover 21 with the aid of the insulation plug 29 through which the electrode 31 is passed being, however, electrically insulated therefrom. A nut 47 is provided on the electrode 31 for tightening the splash plate in its place. The plate 46 is provided with an opening 48 for the passage of the electrode 30 and is thus electrically insulated therefrom. The plate 46 prevents splashing of the wax and water and their reaching the engine when the vehicle goes over rough ground.

It will now be understood in view of the foregoing that my improved device operates to deliver to the engine cylinder rectified mixture of hydrogen and oxygen ready to be ignited without the necessity of evaporating the water and decomposing it in the engine cylinder. In consequence thereof the engine shows marked and consistent improvement in its performance, and the tendency of forming carbon deposits in the combustion chamber thereof is greatly decreased. This, in turn, decreases still further the tendency of the charges to detonate. It has also been found that the amount of carbon monoxide in the engine exhaust is reduced in an unexpectedly large degree indicating more efficient combustion of charges. This feature has important safety implications since carbon monoxide poisoning of vehicle operators in garages or even while driving is not infrequent.

The device is very simple, is readily understood not only by a garage mechanic, but also by an average driver handy with tools, and it can be easily installed in virtually any motor vehicle.

By virtue of the above described method and the provision of the device for carrying out the same, the objects of the present invention and numerous additional advantages are attained.

I claim:

1. In an internal combustion engine having a carburetor and an exhaust manifold, a device for decomposing water by electrolysis, said device including a water receptacle capable of holding a predetermined quantity of water and a layer of molten paraffin on the top of the water, means to conduct heat to said layer from the exhaust manifold to maintain it in molten state, means to collect the gases produced by electrolysis after they pass through said molten layer, and a conduit delivering said gases into the carburetor.

2. An engine as defined by the preceding claim 1, said engine having a storage battery and an electrical conductor to conduct the current from said battery to said device.

3. A hydrogen-oxygen generator adapted to be operatively connected to an internal combustion engine having an intake conduit, and a storage battery, said generator comprising a receptacle adapted to hold a predetermined quantity of water and a layer of molten wax on top of the water, two electrodes arranged within said receptacle to be immersed in water and electrically connected to the terminals of the storage battery for passage of electric current to said electrodes to effect decomposition of water in said receptacle by electrolysis, means to collect the gases produced by electrolysis above said layer of wax, a conduit adapted to conduct the collected gases into said engine intake conduit, and means adapted to conduct heat from the engine to the wax for maintaining the same in molten condition.

4. A hydrogen-oxygen generator adapted to be operatively connected to an internal combustion engine having an intake conduit, an exhaust gases conduit and a storage battery, said generator comprising a receptacle adapted to hold a predetermined quantity of water and a layer of molten wax on top of the water, two electrodes arranged within said receptacle to be immersed in water and electrically connected to the terminals of the storage battery for passage of electric current to said electrodes to effect decomposition of water in said receptacle by electrolysis, a shield plate mounted in said receptacle above the wax, a gas collecting chamber formed above said shield plate, and a conduit leading from said chamber into the engine intake conduit for passage of gases thereinto.

5. A hydrogen-oxygen generator adapted to be operatively connected to an internal combustion engine having an intake conduit, and a storage battery, said generator comprising a receptacle adapted to hold a predetermined quantity of water and a layer of molten wax on top of the water, two electrodes arranged within said receptacle to be immersed in water and electrically connected to the terminals of the storage battery for passage of electric current to said electrodes to effect decomposition of water in said receptacle by electrolysis, a shield plate mounted in said receptacle above the wax, a gas collecting chamber formed above said shield plate, and a conduit leading from said chamber into the engine intake conduit for passage of gases thereinto and a metal member connected to the engine and said receptacle for passage of heat by conduction to said wax and thus maintaining it in molten state.

6. A hydrogen-oxygen generator adapted to be operatively connected to an internal combustion engine having an intake conduit, an exhaust gases conduit and a storage battery, said generator comprising a receptacle adapted to hold a predetermined quantity of water, a cover adapted to seal said receptacle at the top, two electrodes carried by said cover and extending substantially to the bottom of the receptacle, said electrodes being electrically insulated from each other and connected to said battery for passage of electric current to said electrodes to effect decomposition of water in said receptacle by electrolysis, a shield plate carried by one of said electrodes and insulated from the other, said plate being spaced from said cover to form a gas-collecting chamber between itself and said cover, and a conduit leading from said chamber into the engine intake conduit for passage of gases thereinto.

7. A construction as defined by the preceding claim 6, said electrodes being spaced closer at the bottom of the receptacle than at its top.

8. A hydrogen-oxygen generator adapted to be operatively connected to an internal combustion engine having an intake conduit, an exhaust gases conduit and a storage battery, said generator comprising a glass receptacle adapted to hold a predetermined quantity of water, a cover detachably connected to said receptacle to seal and support the same, two electrodes carried by said cover and extending substantially to the bottom of the receptacle, said electrodes being electrically insulated from each other and adapted to be connected to said battery for passage of electric current to said electrodes to effect decomposition of water in said receptacle by electrolysis, a shield plate carried by one of said electrodes and insulated from the other electrode, said plate being spaced from said cover to be disposed above the liquid level in said receptacle and to form between itself and said cover a gas-collecting receptacle, a pipe connection leading from said chamber and adapted to be connected to the engine intake conduit for passage of gases thereinto.

9. A construction as defined by the preceding claim 8, with electrical connection of one of said electrodes with the battery being effected through said cover and the structure of the engine.

10. A hydrogen-oxygen generator adapted to be operatively connected to an internal combustion engine having an intake conduit, an exhaust gases conduit and a storage battery, said generator comprising a glass receptacle adapted to hold a predetermined quantity of water and a layer of wax on top of it, a cover detachably connected to said receptacle to seal and support the same, two electrodes carried by said cover and extending substantially to the bottom of the receptacle, said electrodes being electrically insulated from each other and adapted to be connected to said battery for passage of electric current to said electrodes to effect decomposition of water in said receptacle by electrolysis, a shield plate carried by one of said electrodes and insulated from the other electrode, said plate being spaced from said cover to be disposed above the liquid level in said receptacle and to form between itself and said cover a gas-collecting receptacle, a pipe connection leading from said chamber and adapted to be connected to the engine intake conduit for passage of gases thereinto and a metal member connected to said cover and adapted to be connected to the exhaust gases conduit of the engine to conduct heat to said wax and maintain it in molten state.

11. A construction as defined by the preceding claim 10, said cover being provided with filling opening and means to seal the same.

WALTER DRABOLD.

REFERENCES CITED

The following references are of record in the file of this patent:

UNITED STATES PATENTS

| Number | Name | Date |
|---|---|---|
| 1,632,285 | Georgi | June 14, 1927 |
| 1,865,946 | Niederreither | July 5, 1932 |
| 1,876,879 | Drabold | Sept. 13, 1932 |
| 2,157,090 | Niederreither | May 2, 1939 |